Nov. 14, 1939.   T. TERNSTROM   2,180,177

REFRIGERATOR

Filed May 23, 1936

INVENTOR.
Torolf Ternstrom
Ell Fenander
BY
his ATTORNEY.

Patented Nov. 14, 1939

2,180,177

UNITED STATES PATENT OFFICE 2,180,177

REFRIGERATOR

Torolf Ternstrom, Motala, Sweden, assignor, by mesne assignments, to Servel, Inc., New York, N. Y., a corporation of Delaware Application May 23, 1936, Serial No. 81,380
In Germany October 30, 1935

8 Claims. (Cl. 20—69)

This invention relates to refrigerators, and more particularly to an improved gasket for effectively sealing the doors of refrigerator cabinets.

In sealing the doors of refrigerator cabinets it has generally been the practice to employ gaskets provided with striking beads which are adapted to be subjected primarily to forces that are perpendicular or normal to the gasket. In using such a gasket about the door opening the portion of the gasket arranged along the lock side of the door is subjected to a force substantially perpendicular or normal to the gasket and the portion of the gasket arranged along the hinge side of the door is subjected to oblique forces or forces at an acute angle from the normal. The oblique forces acting on the gasket at the hinge side of the door are due to the fact that this portion of the gasket is only a short distance from the axis of rotation of the door. Since the forces acting on a gasket are not the same about the entire door opening it is difficult in many instances to obtain effective sealing which will prevent the escape of cold air from the cabinet. This is especially true of the portion of the gasket arranged at the hinge side of the door because when the gasket is not sufficiently thick effective sealing is not obtained at this portion of the door opening. When the portion of the gasket at the hinge side of the door is too thick the door may be prevented from fully closing, so that effective sealing is not obtained at the lock side of the door opening. Further, when the portion of the gasket at the hinge side of the door is too thick and the door is locked in its closed position, the likelihood of the door being sprung is increased because of the excessive counterforce set up in the gasket at the hinge side of the door opening.

The object of my invention is to provide an improved gasket which will effectively prevent the escape of cold air from a refrigerator cabinet and will not set up an excessive counterforce about any part of a door opening due to the non-uniform manner in which forces are applied to the gasket.

Further objects and advantages of my invention will become apparent from the following description, and the various features of novelty which characterize my invention will be pointed out with particularity in the claims appended to and forming a part of this specification.

For a better understanding of my invention reference may be had to the following description and accompanying drawing in which.

Figure 1:
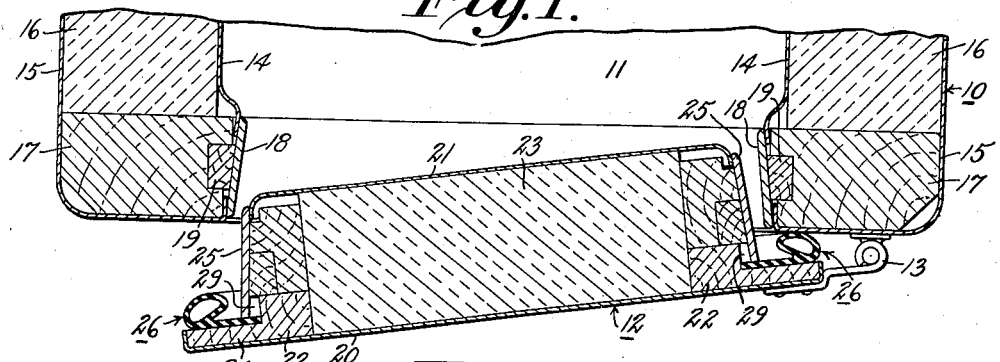
Fig. 1 is a fragmentary view, in section, of a refrigerator cabinet embodying my invention, the door of the cabinet being shown in a partially open position.
Figure 2:
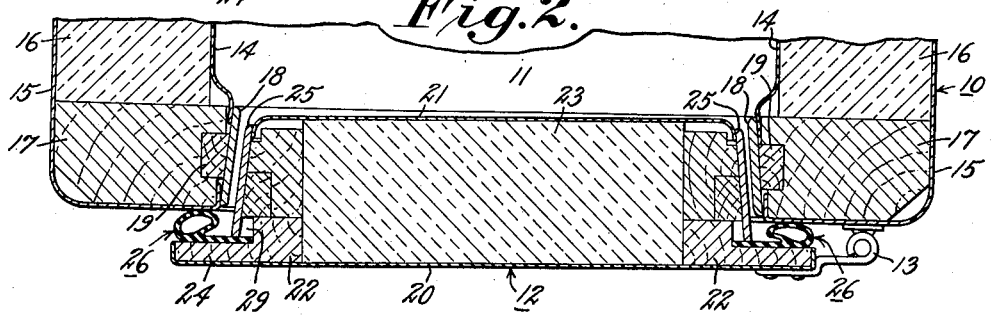
Fig. 2 is a view similar to Fig. 1 with the door in a substantially closed position.

Referring to Figs. 1 and 2, I have shown my invention applied to a refrigerator cabinet 10 having a storage compartment 11 to which access may be had through a door 12 which is hinged at 13 to the front of the cabinet. The refrigerator cabinet 10 comprises a spaced inner lining 14 and an outer wall 15 between which is interposed a suitable heat insulating material 16, and the edges of the inner lining 14 and the outer wall 15 at the door opening are secured to a wooden frame 17. Between the spaced ends of the inner lining 14 and outer wall 15, and overlying the edges thereof, is arranged a jamb molding 18 which is secured to a backing strip 19 fitted into the wooden frame 17.

The door 12 comprises an outer wall 20 and an inner wall or pan 21 maintained in spaced relation by a wooden frame structure 22 with the space therebetween filled with suitable heat insulating material 23. The door frame 22 is provided with an outer ledge 24 which overlies the outer wall 15 about the door opening when the door is closed. The edges of the door pan 21 and outer wall 20 are secured to the door frame 22, and a trim strip 25, which extends over the edge of the door pan 21, is arranged about the door frame 22.

In accordance with my invention I provide a gasket 26 at the ledge 23 for effectively sealing the door 12 when it is locked in its closed position. The gasket 26 preferably comprises a strip of resilient or elastic material, such as rubber, for example, provided with a flat portion 27 and a hollow striking bead 28 having a portion thereof spaced from and overlying the flat portion 27. In the present embodiment the flat portion 27 of the gasket extends into the recess 29 formed in the door frame 22 and is fixed to the ledge 24 by the trim strip 25.

Figure 3:
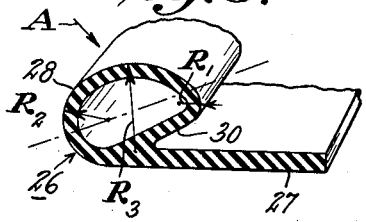
Fig. 3 is an enlarged perspective view, in section, of the gasket shown in Figs. 1 and 2.
Figure 4:
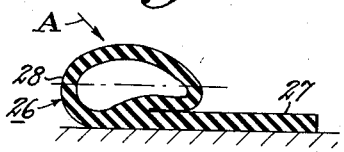
Fig. 4 is a view, in section, of the gasket shown in Fig. 3 to illustrate the shape the striking bead assumes when an oblique force is exerted on the striking bead.

By forming the gasket 26 in the manner just described, a force applied on the outer curved striking surface of the bead 28 in a direction substantially perpendicular or normal to the flat portion 27 of the gasket strip is opposed by the full counterforce developed by the bead. However, when a force is applied on the striking surface of the bead at an acute angle to the normal, in the direction indicated by the arrow A in Fig. 3, for example, an angular or tilting movement of the bead 28 is effected, and the full counterforce is developed by the bead only after the bead bears against the flat portion 27 of the gasket which it overlies, as shown in Fig. 4. It will therefore be apparent that when an oblique force is applied on the striking bead in the manner just indicated, less counterforce is developed by the bead than when a force is applied substantially perpendicular or normal to the bead.

This variation in counterforce developed by the bead 28 with different forces acting on the gasket is effectively utilized for maintaining a seal about the door of a refrigerator cabinet to prevent the escape of cold air. The manner in which my gasket functions is clearly illustrated in Figs. 1 and 2, it being understood that in a full size refrigerator cabinet substantially the same conditions are encountered although in the figures the width of the door 12 is shown relatively small. In Fig. 1 the door 12 is in such a position that the outer curved striking surface of the bead 28 at the hinge side of the door is bearing lightly against the outer wall 15 in front of the cabinet. It will be apparent that with further closing of the door an oblique force will be applied on the bead 28 at an acute angle of about 45° from a plane perpendicular to the flat portion 27 of the gasket strip. With further closing of the door 12 the bead 28 of the gasket at the hinge side of the door is tilted or moved angularly and the counterforce developed by the bead 27 is considerably less than that developed when a force is applied in a direction normal to the gasket.

In Fig. 2 the door 12 is shown in such a position that the curved striking surface of the bead 28 at the lock side of the door is bearing lightly against the outer wall of the cabinet. In this position of the door the bead 28 at the hinge side has substantially completed its tilting movement, and, with further movement of the door to its fully closed or locked position, the beads 28 at both sides of the door have applied thereon a substantially perpendicular force.

In view of the foregoing, it will be apparent that my gasket can always be made sufficiently thick to insure an air tight seal at the hinge side of the door without any likelihood of not being able to close the door fully at its lock side, or without any danger of causing the door to be sprung because of excessive counterforce developed by the gasket when the door is in its locked position.

The striking bead of the gasket I have illustrated as my preferred embodiment in section simulates the shape of an ellipse. The major axis of the approximately elliptical striking bead forms an acute angle of about 30° with the flat portion 27 of the gasket. With this inclination of the bead 28 the gasket develops its full counter force when a force is applied in a direction substantially perpendicular to the gasket and a tilting movement of the bead is effected when a force is applied at an acute angle such as, for example, 45°, as indicated in Fig. 3. This tilting movement continues until the major axis of the bead 28 is substantially parallel to the flat portion 27, as shown in Fig. 4. The acute angle between the top surface of the flat portion 27 and under side 30 of the bead is therefore smaller than the arbitrary angle of 45° previously mentioned, at approximately which angle the force is applied on the gasket at the hinge side of the door in the embodiment illustrated in Figs. 1 and 2. In any particular case, therefore, the acute angle of the bead with respect to the flat portion of the gasket should be chosen to take into consideration the oblique angle at which the forces will be exerted on the striking surface of the bead. Although the under side 30 of the inwardly extending bead may be curved, it is preferable to have this portion substantially flat so that, when an oblique force is applied on the bead, the full angular movement of the bead occurs before the full counterforce is developed by the bead.

It has been mentioned above that the bead 28 illustrated is only approximately elliptical in shape. For sealing the door of a refrigerator cabinet I have successfully used a gasket formed of rubber in which the thickness of the flat portion 27 is approximately .0590 inch (1.5 mm.) and the thickness of the wall of the bead is about .0394 inch (1 mm.). In this particular gasket the radius of curvature $R_1$ at the outer portion of the side 30 is about .0590 inch (1.5 mm.), the radius of curvature $R_2$ of the side opposite the overlying portion is about .1181 inch (3.0 mm.), and the radius of curvature $R_3$ of the extreme outer curved surface is about .2165 inch (5.5 mm.) or about four times greater than the smallest radius of curvature. If desired, the inner portion of the bead 28 can be formed of sponge rubber in order to increase the elasticity of the striking bead.

Figure 5:
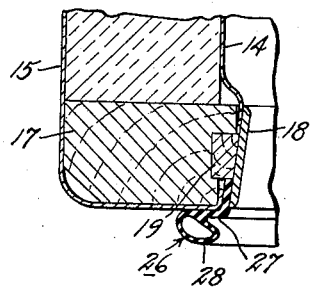
Fig. 5 is a fragmentary view, in section, of a refrigerator cabinet at the door opening illustrating a modification of my invention.

Instead of securing the gasket 26 to the ledge 23 of the door 12, the gasket can also be effectively used when it is fixed to the refrigerator cabinet about the door opening. Such a modification is shown in Fig. 5 with the flat portion 27 of the gasket bent and secured in a recess formed between the edge of the outer lining 15 and the jamb molding 18.

Figure 6:
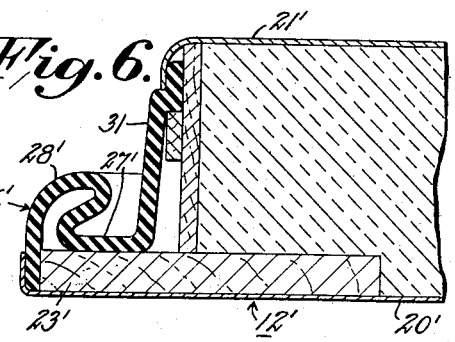
Fig. 6 is a fragmentary view, in section, of a refrigerator door illustrating another modification of my invention.

In the modification illustrated in Fig. 6 the striking bead 28' of the gasket 26' is formed in a sheet of resilient material 31, such as rubber, for example, which is arranged about the peripheral edge of the door 12' and is secured at its longitudinal edges to the door pan 21' and outer wall 20' of the door. The portion of the sheet of resilient material extending from the door pan 21' to the inner surface of the ledge 23' serves as a breaker strip. The sheet of resilient material is so shaped that a portion thereof is caused to bear against the inner surface of the ledge to form the flat portion 27' of the gasket, and from this flat portion the sheet of resilient material is bent back upon itself to overlie the flat portion and then curved or bent in a direction opposite to the flat portion with the outer longitudinal edge thereof secured to the outer wall 20'. In this manner a gasket is obtained which is similar to and functions substantially the same as that shown in Fig. 3 and described above.

While I have shown and described several embodiments of my invention, such variations and modifications are contemplated as fall within the true spirit and scope of my invention, as pointed out in the appended claims.

What is claimed is:

1. A gasket for a refrigerator cabinet closure member comprising a strip having a substantially flat portion provided with a striking bead which in section normally simulates an elliptical shape, the major axis of said bead normally being disposed at an acute angle to the flat portion of said strip with at least a portion of said bead being spaced from and overlying the flat portion of said strip, and said strip being so constructed and arranged that the overlying portion of said striking bead is movable toward said flat portion and the under-side of said bead is movable into a plane substantially parallel with said flat portion when the striking surface of said bead is subjected to pressure to cause movement of said bead.

2. A gasket for a refrigerator cabinet closure member comprising a strip having a substantially flat portion provided with a striking bead which in section normally simulates an elliptical shape, the major axis of said bead normally being disposed at an acute angle to the flat portion of said strip with at least a portion of said bead being spaced from and overlying the flat portion of said strip, the underside of said bead adjacent to and overlying said strip being substantially flat, and said strip being so constructed and arranged that the under-side of the overlying portion of said bead is movable into a plane substantially parallel with the flat portion of said strip when the striking surface of said bead is subjected to pressure to cause movement of said bead.

3. A gasket for a refrigerator door having inner and outer wall members, said gasket comprising a strip of resilient material extending about the peripheral edge of the door with one longitudinal edge thereof adapted to be fixed to the inner wall member and the other longitudinal edge thereof adapted to be fixed to the outer wall member, said strip intermediate the longitudinal edges having a flat portion and a bent portion adjacent said flat portion forming a striking bead to seal the door when it is in its closed position, at least a part of said bent portion overlying said flat portion.

4. A refrigerator cabinet having an opening, a swingable door pivotally supported on said cabinet for closing the opening, said door comprising inner and outer wall members, a strip of resilient material extending about the peripheral edge of the door with one longitudinal edge thereof fixed to said inner wall member and the other longitudinal edge thereof fixed to said outer wall member, said strip intermediate the longitudinal edges thereof having a substantially flat portion and a portion bent back upon itself at one side of said flat portion to form a striking bead to seal said door when it is in its closed position, at least a part of said bent portion being spaced from and overlying the flat portion of said strip.

5. A refrigerator cabinet having an opening, a swingable door pivotally supported on said cabinet for closing the opening, said door comprising inner and outer wall members, a strip of resilient material arranged about the peripheral edge of said door with one longitudinal edge thereof fixed to said inner wall member and the other longitudinal edge thereof fixed to said outer wall member, said strip intermediate the longitudinal edges thereof having a substantially flat portion and a striking bead formed on said strip adjacent said flat portion to provide a seal when said door is in its closed position, at least a portion of said bead being spaced from and overlying the flat portion of said strip.

6. A gasket for a refrigerator cabinet closure member comprising a strip having a substantially flat portion provided with a hollow striking bead, said bead having a curved striking surface with at least a portion thereof spaced from and overlying the flat portion of said strip, and said strip being so constructed and arranged that unobstructed angular movement of said striking bead may be effected toward said flat portion with said striking bead only capable of moving through an acute angle when the striking surface of said bead is subjected to pressure to cause such angular movement.

7. For use with a refrigerator cabinet having cooperating fixed and movable members, a gasket comprising a strip having a relatively flat portion associated with one of said members and a striking bead adapted to contact the other of said members to form a seal, said striking bead in section normally having one axis longer than its other axis with the longer axis forming an acute angle with said one member with which it is associated, and said strip being so constructed and arranged that said striking bead is movable toward said one member and the underside thereof is movable into a plane substantially parallel with said one member when the striking surface of said bead is subjected to pressure by the other of said members.

8. For use with a refrigerator cabinet having cooperating fixed and movable members, a gasket comprising a strip associated with one of said members and having an angularly movable striking bead for contacting the other of said members to form a seal, said striking bead normally overlying said one member more on one side than on the other side of the region where it is joined to said strip and generally being at an acute angle with respect to said strip, and said strip being so constructed and arranged that said striking bead is movable toward said one member and the underside of said bead is movable into a plane substantially parallel with said one member when the striking surface of said bead is subjected to pressure by the other of said members to cause such angular movement.

TOROLF TERNSTROM.